Feb. 18, 1964

J. W. FODREA 3,121,344

GEAR SHIFT ASSEMBLY

Filed Jan. 16, 1963

INVENTOR.
James W. Fodrea
BY
*A. M. Heiter*
ATTORNEY 3,121,344
Patented Feb. 18, 1964

3,121,344
GEAR SHIFT ASSEMBLY
James W. Fodrea, Rochester, Mich., assignor to General Motors Corporation, Detroit, Mich., a corporation of Delaware
Filed Jan. 16, 1963, Ser. No. 251,882
10 Claims. (Cl. 74—473)

This invention relates to controls and more particularly to a clutching mechanism for a transmission control assembly having variable rate biasing means providing different spring forces for resisting movement of the transmission control from one shift position to another.

The manual transmission control mechanism for automotive vehicle transmissions is conventionally mounted on the steering column of the vehicle with the hand control lever located beneath the steering wheel. The control lever is pivoted on the steering column and actuates a control tube to selectively and alternately operate a plurality of transmission shift levers. Control linkage connects the shift levers to the transmission to be controlled, the transmission being either the manually shiftable or automatic type. In transmission controls of this type a spring is arranged so as to yieldingly hold the control tube in a normal shift operating position and provides a biasing force resisting movement of the control tube to another shift operating position and acts to return the control tube from the latter shift operating position to the normal shift operating position when the control tube is rotated to its neutral position.

In one illustrated embodiment of the invention a transmission control assembly is mounted on a steering column and has a clutching mechanism to selectively and alternately connect the control tube to each of three shift levers including a reverse shift lever. A two spring arrangement provides one spring force resisting movement of the control tube from one shift position to a second shift position and another spring force larger than the one spring force resisting movement of the control tube from the second shift position to a third shift position, the third shift position corresponding to selection of the reverse shift lever. The increased resistance for movement of the control tube to the position corresponding to the selection of the reverse shift lever provides detent feel which is sensed by the operator and acts to prevent inadvertent shifting of the control tube into the reverse shift position.

An object of the present invention is to provide in a control assembly, a control member and a plurality of transmission control levers selectively and alternately clutched to the control member so that the control member rotates one of the shift levers when the control member is rotated, and variable rate biasing means providing one biasing force resisting movement of the control member to select one of the shift levers and another biasing force resisting further movement of the control member to a position to select another of the shift levers.

Another object is to provide in a transmission control assembly, a plurality of transmission shift levers including a reverse shift lever and a control tube operable to selectively and alternately rotate each of the shift levers when the control tube is rotated, and variable rate biasing means resisting movement of the control tube to a position corresponding to the selection of one of the shift levers and providing another resisting force resisting movement of the control tube when the latter is moved to a position corresponding to the selection of the reverse shift lever.

Another object is to provide in a transmission control assembly, a plurality of shift levers including a reverse shift lever, a control tube and clutch means on the levers and control tube for selectively and alternately connecting the levers to the control tube when the control tube is moved to positions corresponding to each of the levers, and variable rate biasing means providing a relatively large biasing force resisting movement of the control tube to a position corresponding to the reverse lever and a smaller force resisting movement of the control tube to the positions corresponding to the other shift levers.

Another object is to provide a transmission control assembly for a four speed ratio and reverse transmission having a 3–4 shift lever, a 1–2 shift lever, a reverse shift lever and a control tube, clutch means selectively and alternately connecting the shift levers to the control tube to rotate one of the shift levers when the control tube is rotated, and variable rate biasing means normally urging the control tube to a position corresponding to the 3–4 shift lever and providing one biasing force resisting further movement of the control tube to a position corresponding to the 1–2 shift lever and another biasing force larger than the one biasing force resisting further movement of the control tube from the 1–2 shift lever position to a position corresponding to the reverse shift lever.

These and other objects of the invention will be more apparent from the following description and drawings of a preferred embodiment of the invention.

Figure 1:
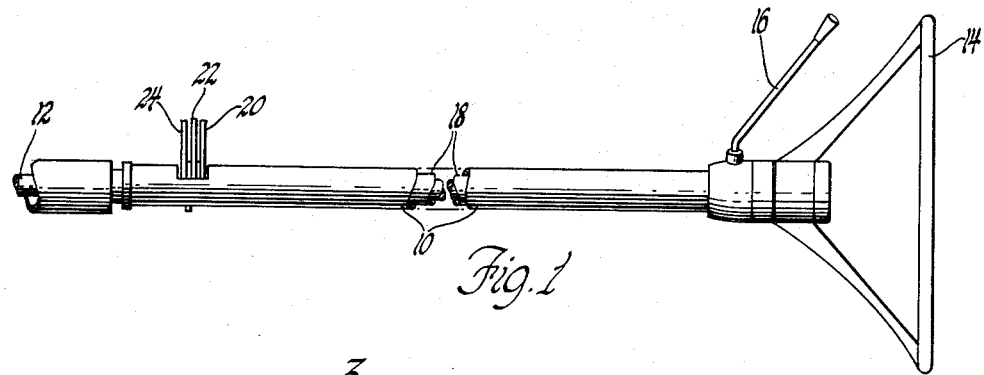
FIGURE 1 is a view showing the general arrangement of the transmission control mounted on a steering column.

One modification of the transmission control as shown in FIGURE 1 may be employed to control a manually shiftable transmission of the type having four speed ratios and reverse. A steering column 10 is mounted on the automotive vehicle body and rotatably supports a steering shaft 12 located concentrically within the column and a steering wheel 14 is connected to the steering shaft. A manual transmission control lever 16 is mounted on the steering column 10 beneath the steering wheel 14 and actuates a control tube 18 to effect operation of a plurality of transmission shift levers 20, 22 and 24. The shift levers 20, 22 and 24 correspond to a 3–4 speed ratio shift lever, a 1–2 speed ratio shift lever, and reverse speed ratio shift lever respectively and are adaptable to be connected by suitable linkage to corresponding transmission control levers on the transmission to control the operating conditions of the transmission. For convenience in defining the relative position of the parts, the left end of the steering column as viewed in FIGURE 1 is referred to as the lower end, and the right end is referred to as the upper end.

Figure 2:
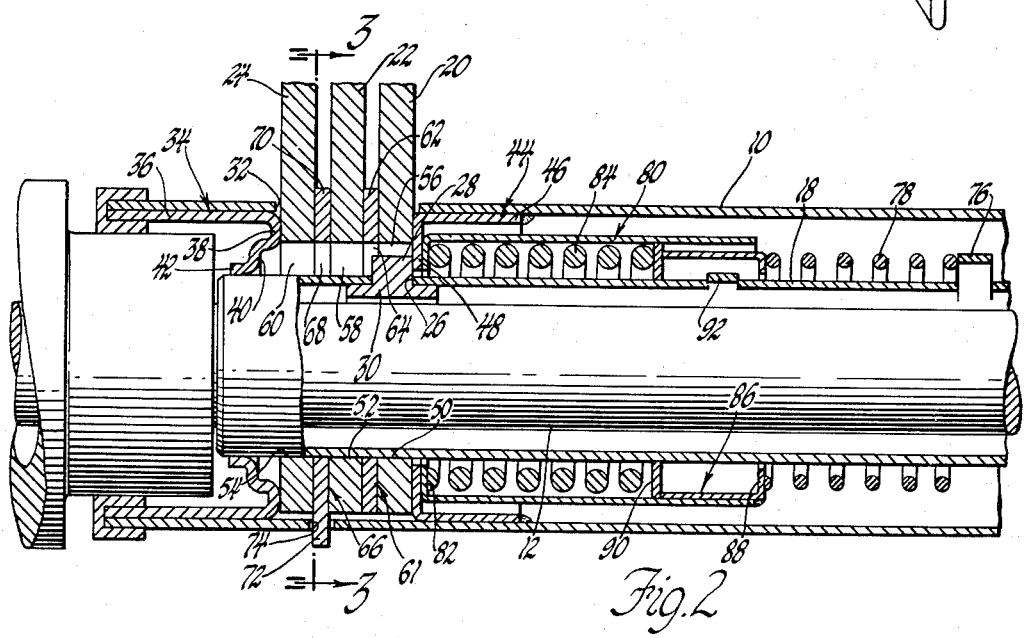
FIGURE 2 is a partial fragmentary sectional view of the transmission control.

As best shown in FIGURE 2, at the lower end of the control tube 18 there is provided a partial circumferential slot 26 in which a key member 28 is inserted to provide a key on the outer surface of control tube 18. The key member 28 includes a partial cylindrical flange 30 abutting the inside surface of control tube 18 and is welded thereto. Steering column 10 has an opening 32 at one side adjacent the lower end and shift levers 20, 22 and 24 project therethrough. At the lower edge of opening 32 in the steering column, there is provided an abutment member 34 having a cylindrical flange 36 welded to column 10 and an integral annular flange 38 which provides an abutment and guide for lever 24. Abutment member 34 includes an inner annular flange portion 40 formed in spaced relationship relative to lever 24 and provides clearance between member 34 and key 28 to prevent interference or rubbing. Another integral annular portion 42 of abutment member 34 provides a lower bearing support for control tube 18. At the upper edge of opening 32 there is provided an abutment member 44 having a cylindrical flange 46 welded to steering column 10 and includes an inwardly projecting flange portion 48. Flange portion 48 provides an abutment and guide for the lever 20 and a stop to limit upward movement of key 28 and control tube 18. Sufficient clearance is provided between flange 48 and control tube 18 to prevent rubbing therebetween during movement of control tube 18 relative to flange 48.

Each of the levers 20, 22 and 24 has an annular portion including a central aperture 50, 52 and 54 respectively to rotatably mount the shift levers on the control tube 18. The annular portions of the shift levers 20, 22 and 24 have similar recesses or keyways 56, 58 and 60 respectively to receive key 28 and the keyways axially align with each other when the shift levers are in a neutral position. An annular thrust washer 61 is disposed between 3–4 shift lever 20 and 1–2 shift lever 22 and has an arcuate shaped radially extending portion 62 set in the opening 32 in column 10 to prevent rotation of thrust washer 61 relative to column 10. An elongated recess or keyway 64 larger than the keyways in the shift levers is provided in washer 61 so that the key 28 will pass between the levers 20 and 22 when they are in any of their respective shift positions. The elongated recess 64 is provided because the transmission to which the respective levers 20 and 22 are to be connected has internal interlock means between the 1–2 and 3–4 speed ratio selectors, thus an interlock between the levers 20 and 22 is not necessary. In transmissions having no internal interlock means, interlock means as interlock plate 66 would be provided between the levers 20 and 22.

Figure 3:
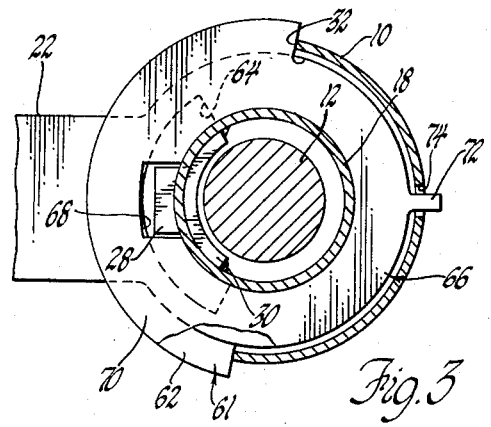
FIGURE 3 is a partial sectional end view taken on the line 3—3 in FIGURE 2.

Between the reverse shift lever 24 and the 1–2 shift lever 22 there is disposed an interlock plate 66, as best shown in FIGURE 3, having a recess or keyway 68 similar to the keyways in the shift levers 22 and 20 so that levers 22 and 34 must be in a neutral position to permit the key 28 to pass through keyway 68. The interlock member 66 has been provided because the transmission to which the reverse lever is to be connected has no internal interlock means between the reverse and 1–2 speed ratio selectors, however, the interlock member would not be necessary where internal interlock means are provided in the transmission between the forward speed ratio and the reverse speed ratio selectors. Interlock member 66 has an arcuate shaped radially extending portion 70 fitting in opening 32 in the column 10 and a tongue 72 engaging the steering column at 74 to prevent rotation of the interlock member 66 relative to steering column 10.

Control tube 18 has a plurality of offset integral tongues 76 circumferentially spaced thereabout providing an abutment for a light coil spring 78, the spring 78 at its lower end engaging a spring cage member 80. Cage 80 has at its lower end an integral inwardly projecting abutment flange 82 providing a lower abutment for a heavy coil spring 84 and flange 82 is arranged in abutting relationship with flange 48 fixed to column 10. Flange 82 like flange 48 is provided with sufficient clearance relative to control tube 18 to prevent rubbing between flange 82 and control tube 18 when the control tube is moved relative thereto. The upper end of cage 80 has a cylindrical sleeve 86 arranged internally thereof and welded to cage 80. Sleeve 86 provides an abutment for annular abutment ring 90 which abuts the upper end of spring 84 and includes an integral inwardly projecting flange 88 providing an abutment for the lower end of spring 78.

Caged spring 84 has a high spring force and spring 78 has a low spring force, however, both springs 84 and 78 have relatively low spring rates so as not to require unduly large forces to effect movement of the control tube to the shift positions. Caged spring 84 holds abutment 90 in contact with sleeve 86 and is compressed to provide a relatively high resisting force resisting movement of abutment 90 to compress spring 84 so that initial movement of abutment 90 requires the same high force. Spring 78 is prestressed to hold key 28 in contact with flange 48 and in keyway 56 in lever 20.

Flange 88 is provided with sufficient clearance between it and control tube 18 to prevent rubbing when control tube 18 is moved relative to flange 88. Moveable abutment 90 is in spaced relationship to control tube 18 and cage 80 and is capable of movement in an axial direction relative to control tube 18 and cage 80.

Above moveable abutment 90, control tube 18 has a plurality of offset integral tongues 92 circumferentially spaced thereabout providing an abutment contactable with abutment 90 to compress spring 84. Tongues 92 are axially spaced relative to moveable abutment 90 in the position shown in FIGURE 2 so that the axial distance between tongues 92 and moveable abutment 90 is equivalent to the axial distance between the lower edge of key 28 and the upper edge of keyway 60 in the lever 24. The interior of sleeve 86 is in spaced relationship to the outer extremity of tongues 92 to provide clearance between sleeve 86 and tongues 92 to prevent rubbing and interference therebetween when the control tube 18 and key 28 are moved to a position where key 28 enters keyway 60 in lever 24 and tongues or abutment 92 contact with abutment 90.

In the position shown in FIGURE 2, rotation of control tube 18 will rotate the 3–4 shift lever 20 to either the third or fourth speed ratio selecting position. The control tube 18 may be moved downwardly only when levers 20 and 22 and control tube 18 are all in a neutral position and the key 28 will pass through the opening 64 in thrust washer 61 with control tube abutment 76 engaging spring 78 and compressing spring 78 against flange 88. Thus during movement from the 3–4 shift lever 20 position to the 1–2 shift lever 22 position, only spring 78 is compressed providing a low resistance to movement of the control tube but sufficient to bias the control tube from the 1–2 position to the 3–4 position. Inadvertent movement beyond the 1–2 position is prevented by the heavy prestressed caged spring 84. In the 1–2 shift lever 22 position rotation of control tube 18 through key 28 will rotate the 1–2 shift lever 22 to either the first or second speed ratio selecting position. On further downward movement of the control tube 18 to the reverse shift lever 24, the shift lever 22 and control tube 18 must be in neutral so that the key 28 may pass through keyway 68. Upon downward movement of control tube 18 with the keyway 68 aligned with key 28 the control tube abutment 92 will contact the moveable abutment 90 and move abutment 90 downwardly compressing spring 84. During this downward movement to the reverse shift lever 24 position both the light spring 78 and the heavy spring 84 are compressed simultaneously to provide a substantially increased resistance for movement into the reverse position thus providing a substantial or pronounced detent feel when the control tube 18 is shifted to the reverse position. Since spring 84 is caged under substantial compression this change in the resistance to the movement of the control tube on moving from the 1–2 position to the reverse position is abrupt.

The above-described preferred embodiment is illustrative of the invention which may be modified within the scope of the appended claims.

I claim:
1. In a transmission control assembly comprising in combination, support means, control means supported by said support means for rotary and reciprocal axial movement relative to a fixed axis, a plurality of shift levers supported by said support means for swinging movement about said fixed axis, said control means being reciprocally axially moveable to a position corresponding to each lever, clutch means for selectively operatively connecting said control means to one of said levers in each of the positions to swing said one lever when said control means is rotated, and variable rate spring means interposed between said control means and support means providing one biasing force resisting axial movement of said control means when said control means is axially moved from a first position to a second position and a larger biasing force resisting axial movement of said control means from the second position to a third position.

2. In a transmission control assembly comprising in combination support means, control means supported by said support means for rotary and reciprocal axial movement relative to a fixed axis, a plurality of shift levers supported by said support means for swinging movement about said fixed axis, said control means being reciprocally axially moveable to a position corresponding to each lever including at least three positions, clutch means on said levers and control means for selectively operatively connecting said control means to one of said levers in each of the positions to swing said one lever when said control means is rotated, and variable rate spring means interposed between said control means and support means, said variable rate spring means providing a biasing force resisting axial movement of said control means in one axial direction relative to said fixed axis when said control means is axially moved in the one axial direction from a first position to a second position and an abruptly increased biasing force resisting further axial movement of said control means in the one axial direction from the second position to a third position.

3. In a transmission control assembly comprising in combination, support means, control means supported by said support means for rotary and reciprocal axial movement relative to a fixed axis, a plurality of shift levers supported by said support means for swinging movement about said fixed axis, said control means being reciprocally axially moveable to a position corresponding to each lever including at least three positions, clutch means for selectively operatively connecting said control means to one of said levers in each of the positions to swing said one lever when said control means is rotated, and variable rate spring means interposed between said control means and support means normally urging said control means in one axial direction relative to said fixed axis to a first position, said variable rate spring means providing a biasing force resisting axial movement of said control means when said control means is axially moved in the other axial direction relative to said fixed axis from the first position to a second position and an abruptly increased biasing force resisting further axial movement of said control means in said other axial direction from the second position to a third position.

4. In a transmission control assembly comprising in combination, support means, control means supported by said support means for rotary and reciprocal axial movement relative to a fixed axis, a plurality of shift levers supported by said support means for swinging movement about said fixed axis, said control means being reciprocally axially moveable to a position corresponding to each lever including at least three positions, clutch means for selectively operatively connecting said control means to one of said levers in each of the positions to swing said one lever when said control means is rotated, and variable rate spring means interposed between said control means and support means normally urging said control means in one axial direction relative to said fixed axis to a first position, said variable rate spring means comprising a pair of spirngs having unequal spring forces and arranged so that one of said springs provides one resisting force resisting axial movement of said control means when said control means is axially moved in the other axial direction relative to said fixed axis from the first position to a second position and said springs conjunctively provide another resisting force resisting further axial movement of said control means in said other axial direction from the second position to a third position.

5. In a transmission control assembly comprising in combination, support means, control means supported by said support means for rotary and reciprocal axial movement relative to a fixed axis, a plurality of shift levers supported by said support means for swinging movement about said fixed axis, said control means being reciprocally axially moveable to a position corresponding to each lever including at least three positions, clutch means for selectively operatively connecting said control means to one of said levers in each of the positions to swing said one lever when said control means is rotated, and variable rate spring means interposed between said control means and support means, said variable rate spring means including a pair of springs having different spring forces, one of said springs being arranged relative to said control means to normally urge said control means in one axial direction relative to said fixed axis to a first position and provides one resisting force resisting axial movement of said control means in the other axial direction to a second position and a third position, the other of said springs being prestressed and arranged relative to said control means such that said other spring acts conjunctively with said one spring to provide a second resisting force larger than said one resisting force to resist axial movement of said control means when said control means is moved from said second position to said third position.

6. In a transmission control assembly comprising in combination, support means, control means supported by said support means for rotary and reciprocal axial movement relative to a fixed axis, a pair of shift levers and a reverse shift lever supported by said support means for swinging movement about said fixed axis, said control means being reciprocally axially moveable to a position corresponding to each lever, clutch means for selectively operatively connecting said control means to one of said levers in each of the positions to swing said one lever when said control means is rotated, and variable rate spring means interposed between said control means and support means, said variable rate spring means including a pair of springs, one of said springs having a smaller spring force than the other, said one spring arranged relative to said support means and control means to provide a low resisting force to resist movement of said control means in one direction axially of said fixed axis to positions corresponding to the selection of said levers, and said other spring being prestressed and arranged to act in conjunction with said one spring so that said springs acting together provide a high resisting force larger than the separate spring forces of said springs to resist movement of said control means when said control means is moved in said one direction to the position corresponding to selection of said reverse lever.

7. In a transmission control assembly adapted for use with a four speed ratio and reverse transmission the combination of a support column having an opening, a control tube having an axis arranged interior of said column and supported by said column for rotary and reciprocal axial movement relative to said axis, a reverse shift lever, a plurality of forward shift levers, said levers being arranged in the opening of said column and mounted on said control tube for rotary movement relative to said axis, said control tube being selectively reciprocally axially moveable to a position corresponding to each said lever, clutch means on said control tube and levers for selectively and alternately clutching said levers to said control tube to rotate one of said levers when said control tube is rotated, cage abutment means disposed internal of said column and fixed against axial movement in one axial direction relative to said axis and column, said control tube having a pair of abutments, a first spring having a low spring force mounted between said cage abutment means and one of said abutments normally urging said control tube in a direction opposite to said one axial direction and away from the positions corresponding to said levers and providing a low resisting force resisting movement of said control tube in said one axial direction to the positions corresponding to said levers, a second spring having a high spring force at one end being fixed against movement in said one axial direction relative to said axis and column, a moveable abutment member abutting the other end of said second spring and reciprocally axially moveable relative to said axis and column, said second spring being normally compressed, said second abutment spaced on said control tube relative to said moveable abutment member so that when said control tube is axially moved to the position corresponding to said reverse lever said second abutment contacts said moveable abutment member and further compresses the normally compressed said second spring so that said one and second springs are simultaneously compressed to provide a pronounced detent feel when said control tube is initially moved to the position corresponding to said reverse lever.

8. In a transmission control assembly adapted for use with a four speed ratio and reverse transmission the combination of a support, a control tube having an axis arranged interior of said column and supported by said column for rotary and reciprocal axial movement relative to said axis, said column having an upper and a lower end and an opening, a reverse shift lever, a 1–2 shift lever, a 3–4 shift lever, said shift levers being arranged in the opening of said column and having integral annular portions mounted externally on said control tube for rotary movement relative to said axis, said control tube being reciprocally axially moveable to a position corresponding to each said lever, keyways in the annular portion of each said lever, a key fixed to said control tube and selectively and alternately received by the keyways of said levers to rotate one of said levers when said control tube is in the position corresponding to said one lever and is rotated, an upper annular abutment member adjacent said opening and fixed to said column and arranged to contact said key to limit movement of said control tube in the direction of the upper end of said column, a cage member disposed internal of said column, said cage member being fixed against movement in the direction of the lower end of said column, said control tube having a first and second abutment, a first spring having one spring force, said first spring having one end abutting said cage member and the other end abutting said first abutment and normally biasing said control tube to the position corresponding to said 3–4 shift lever and providing a low resisting force resisting axial movement of said control tube to the positions corresponding to said 1–2 and reverse shift levers, a second spring having a spring force larger that of said one spring, said second spring at one end being fixed against movement in the direction of the lower end of said column, a moveable abutment member in abutting relationship with the other end of said second spring, said second spring being normally prestressed, said second abutment being axially spaced on said control tube relative to said moveable annular abutment member so that when said control tube is axially moved from the position corresponding to said 1–2 shift lever to the position corresponding to said reverse lever said second abutment contacts said moveable annular abutment member and compresses the prestressed said second spring so that said one and second springs act together to provide a resisting force resisting movement of said control tube to the position corresponding to said reverse lever.

9. In a transmission control assembly adapted for use with a four speed ratio and reverse transmission the combination of a support column, a control tube having an axis arranged interior of said column and supported by said column for rotary and reciprocal axial movement relative to said axis, said control tube having an upper and a lower end and an opening in said column adjacent said lower end, a reverse shift lever, a 1–2 shift lever, a 3–4 shift lever, said levers arranged in the opening of said column and having integral annular portions mounted externally on said control tube for rotary movement relative to said axis, said control tube being reciprocally axially moveable to a position corresponding to each said lever, key means fixed to said control tube and selectively and alternately received by the keyway means of said levers to rotate one of said levers when said control tube is in the position corresponding to said one lever and is rotated, said levers being arranged relative to each other so that said 2–3 shift lever is interposed between said reverse shift lever and said 3–4 shift lever, and said 3–4 shift lever is nearest the upper end of said column, an upper annular abutment member internal of said column and fixed thereto and arranged to contact said key means to limit axial movement of said control tube in the direction of the upper end of said column, an annular elongated cage member disposed internal of said column, an end portion on one end of said cage member in abutting relationship with said upper annular abutment member, said control tube having a first plurality of offset tongues circumferentially spaced thereabout providing a first abutment, a first spring having a low spring force mounted between the other end of said cage member and said first abutment and normally compressed to urge said control tube and key means in the direction of the upper end of said column so that said key means contacts said upper annular abutment member and is received in the keyway means in said 3–4 shift lever, said one coil spring providing a low resisting force resisting movement of said control tube from the position corresponding to said 3–4 shift lever to the positions corresponding to said 1–2 and reverse shift levers, a second spring having a high spring force disposed internal of said cage member, said second spring at one end abutting said end portion of said cage member, a moveable abutment member in abutting relationship with the other end of said second spring and reciprocally moveable relative to said cage member and control tube, said second spring being normally prestressed, said control tube having a second plurality of offset tongues circumferentially spaced thereabout providing a second abutment, said second abutment being axially spaced on said control tube relative to said moveable annular abutment member so that when said control tube is axially moved from the position corresponding to said 1–2 shift lever to the position corresponding to said reverse lever said second abutment contacts said moveable annular abutment member and compresses the prestressed said second spring so that said one and second springs conjunctively provide a resisting force substantially larger than the separate spring forces provided by said one and second springs resisting movement of said control tube to the position corresponding to said reverse lever.

10. In a transmission control assembly adapted for use with a four speed ratio and reverse transmission the combination of a longitudinal support column, a control tube having an axis arranged interior of said column and supported by said column for rotary and reciprocal axial movement relative to said axis, said column having an upper and a lower end and an opening adjacent said lower end, a reverse shift lever, a 1–2 shift lever, a 3–4 shift lever, said levers being arranged in the opening of said column and having integral annular portions mounted externally on said control tube for rotary movement relative to said axis, said control tube being reciprocally axially moveable to a position corresponding to each said lever, keyway means in the annular portion of each said lever, key means fixed to said control tube and selectively and alternately received by the keyway means of said levers to rotate one of said levers when said control tube is in the position corresponding to said one lever and is rotated, said levers being arranged relative to each other so that said 2–3 shift lever is interposed between said reverse shift lever and said 3–4 shift lever, and said 3–4 shift lever is nearest the upper end of said column, an upper annular abutment member internal of said column and fixed to said column and arranged to contact said key means to limit axial movement of said control tube in the axial direction of the upper end of said column, an annular elongated cage member disposed internal of said column and surrounding said control tube, said cage member having an abutting flange at one end in abutting relationship with said upper annular abutment member, an abutment sleeve internal of said cage member surrounding said control tube and fixed to said cage member, said control tube having a first plurality of offset tongues circumferentially spaced thereabout providing a first abutment, a first coil spring having a low spring force received on said control tube and mounted between said abutment sleeve and first abutment and normally compressed to urge said control tube and key means in the direction of the upper end of said column so that said key means contacts said upper annular abutment member and is received in the keyway means in said 3-4 shift lever, said one coil spring providing a low resisting force resisting movement of said control tube from the position corresponding to said 3-4 shift lever to the positions corresponding to said 1-2 and reverse shift levers, a second coil spring having a high spring force received on said control tube and disposed internal of said cage member, said second coil spring at one end being in abutting relationship with the abutting flange of said cage member, a moveable annular abutment member received on said control tube and disposed internal of said cage member and reciprocally moveable relative to said cage member and control tube and in abutting relationship with the other end of said second coil spring, said second coil spring being normally prestressed and urging said moveable abutment member into abutting relationship with said abutment sleeve, said control tube having a second plurality of offset tongues circumferentially spaced thereabout providing a second abutment, said second abutment being axially spaced on said control tube relative to said moveable annular abutment member so that when said control tube is axially moved from the position corresponding to said 1-2 shift lever to the position corresponding to said reverse lever said second abutment contacts said moveable annular abutment member and compresses the prestressed said second coil spring so that said one and second coil springs conjunctively provide a resisting force substantially larger than the separate spring forces provided by said one and second springs resisting movement of said control tube to the position corresponding to said reverse lever.

References Cited in the file of this patent

UNITED STATES PATENTS

| | | |
|---|---|---|
| 2,631,467 | Lincoln et al. | Mar. 17, 1953 |
| 2,875,637 | Gurney et al. | Mar. 3, 1959 |
| 3,025,714 | Bliss | Mar. 20, 1962 |
| 3,025,715 | Grady | Mar. 20, 1962 |
| 3,049,023 | McCordic | Aug. 14, 1962 |